(12) United States Patent
Kang et al.

(10) Patent No.: US 11,088,361 B2
(45) Date of Patent: Aug. 10, 2021

(54) SECONDARY BATTERY

(71) Applicant: CONTEMPORARY AMPEREX TECHNOLOGY CO., LIMITED, Ningde (CN)

(72) Inventors: Meng Kang, Ningde (CN); Tianquan Peng, Ningde (CN); Yuliang Shen, Ningde (CN); Jiazheng Wang, Ningde (CN); Libing He, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 192 days.

(21) Appl. No.: 16/389,752

(22) Filed: Apr. 19, 2019

(65) Prior Publication Data
US 2019/0334160 A1 Oct. 31, 2019

(30) Foreign Application Priority Data

Apr. 28, 2018 (CN) .......................... 201810397605.7

(51) Int. Cl.
*H01M 4/133* (2010.01)
*H01M 4/587* (2010.01)
*H01M 10/0525* (2010.01)
*H01M 10/058* (2010.01)
H01M 4/02 (2006.01)

(52) U.S. Cl.
CPC ......... *H01M 4/133* (2013.01); *H01M 10/058* (2013.01); *H01M 10/0525* (2013.01); *H01M 2004/027* (2013.01)

(58) Field of Classification Search
CPC ... H01M 4/133; H01M 4/587; H01M 10/0525
See application file for complete search history.

(56) References Cited

U.S. PATENT DOCUMENTS

| | | | |
|---|---|---|---|
| 2002/0012830 A1* | 1/2002 | Uemura | H01M 4/505 429/60 |
| 2014/0154941 A1 | 6/2014 | Zhamu et al. | |
| 2014/0227588 A1* | 8/2014 | Kim | H01M 4/625 429/188 |

FOREIGN PATENT DOCUMENTS

| | | |
|---|---|---|
| CN | 102637859 A | 8/2012 |
| CN | 105215331 A | 1/2016 |
| CN | 103259046 B | 5/2016 |
| CN | 106477569 A | 3/2017 |
| EP | 2790252 A1 * 10/2014 | ............ H01M 4/625 |
| KR | 20180028797 A | 3/2018 |

OTHER PUBLICATIONS

Liu et al. Aug. 15, 2012. CN 102637859. English machine translation. (Year: 2012).*
Contemporary Amperex Technology Co., Limited, The Extended European Search Report, EP19170786.8, dated Sep. 30, 2019, 7 pgs.
Contemporary Amperex Technology Co., Limited, First Office action, CN201810397605.7, dated Feb. 11, 2019, 6 pgs.

* cited by examiner

*Primary Examiner* — James Lee
(74) *Attorney, Agent, or Firm* — Morgan, Lewis & Bockius LLP

(57) ABSTRACT

The present disclosure provides a secondary battery, the secondary battery comprises a positive electrode plate, a negative electrode plate, a separator and an electrolyte, the negative electrode plate comprises a negative current collector and a negative film, the negative film is provided on at least one surface of the negative current collector and comprises a negative active material. The secondary battery satisfies relationships $3.9 \leq G \times 3.5 + 2.8/CB \leq 6.2$ and $1.23 \leq 0.55/V_{OI} + CB \times 1.2 \leq 2.80$ at the same time. The battery of the present disclosure has the characteristics of high energy density and excellent dynamics performance, and the battery of the present disclosure also has the characteristic of long cycle life while charged under a large rate and a fast speed.

12 Claims, No Drawings

SECONDARY BATTERY

CROSS-REFERENCE TO RELATED APPLICATIONS

The present application claims priority to Chinese patent application No. CN201810397605.7, filed on Apr. 28, 2018, which is incorporated herein by reference in its entirety.

FIELD OF THE PRESENT DISCLOSURE

The present disclosure relates to the field of battery, and particularly relates to a secondary battery.

BACKGROUND OF THE PRESENT DISCLOSURE

Rechargeable batteries represented by lithium-ion batteries are widely used in new energy automotives due to significant characteristics of light weight, high energy density, no pollution, none memory effect, long service life and the like. However, a longer charging time is one of the key factors limiting the rapid popularizion of the new energy automotives. From the viewpoint of technical principle, a core of the fast charging technology of the battery is how to improve the tranferring speed of the lithium ions between the positive electrode plate and the negative electrode plate by harmonizing the chemical system and optimizing the design of the chemical system. If the negative electrode plate cannot bear a large charging rate, the lithium metal will be precipitated on the negative electrode plate when the battery is charged under a large charging rate, and a large amount of side-products are also generated on the surface of the negative electrode plate, which affects the cycle life and the safety performance of the battery. Therefore, the key of the fast charging technology of the battery lies in the design of the negative active material and the design of the negative electrode plate.

At present, the negative active material used in the fast-charging battery mainly comprises lithium titanate and amorphous carbon in the industry, although the rate performance thereof is better, the energy density of the battery using the aforementioned two negative active materials is lower, which is unable to meet present use demands.

Therefore, how to obtain a fast charging capability without compromising the energy density is the key in the design of the battery.

SUMMARY OF THE PRESENT DISCLOSURE

In view of the problem existing in the background, an object of the present disclosure is to provide a secondary battery, which has the characteristics of high energy density and excellent dynamics performance, and also has the characteristic of long cycle life while charged under a large rate and a fast speed.

In order to achieve the above object, the present disclosure provides a secondary battery, which comprises a positive electrode plate, a negative electrode plate, a separator and an electrolyte, the negative electrode plate comprises a negative current collector and a negative film, the negative film is provided on at least one surface of the negative current collector and comprises a negative active material. The negative active material comprises graphite, and the secondary battery satisfies relationships: $3.9 \leq G \times 3.5 + 2.8/CB \leq 6.2$ and $1.23 \leq 0.55/V_{OI} + CB \times 1.2 \leq 2.80$ at the same time. G represents a graphitization degree of the negative active material; CB represents a capacity excess ratio of the battery, which is a ratio of a capacity of the negative electrode plate to a capacity of the positive electrode plate under the same area; $V_{OI}$ represents an OI value of the negative film.

Compared with the existing technologies, the present disclosure at least includes the following beneficial effects: the negative active material of the present disclosure comprises graphite, and by matching the relationship among the graphitization degree of the negative active material represented by G, the OI value of the negative film represented by $V_{OI}$ and the capacity excess ratio of the battery represented by CB, the battery having the characteristics of high energy density, long cycle life and excellent dynamics performance at the same time is obtained.

DETAILED DESCRIPTION

Hereinafter a secondary battery according to the present disclosure is described in detail.

The secondary battery according to the present disclosure comprises a positive electrode plate, a negative electrode plate, a separator and an electrolyte, the negative electrode plate comprises a negative current collector and a negative film, the negative film is provided on at least one surface of the negative current collector and comprises a negative active material. The negative active material comprises graphite, and the secondary battery satisfies relationships: $3.9 \leq G \times 3.5 + 2.8/CB \leq 6.2$ and $1.23 \leq 0.55/V_{OI} + CB \times 1.2 \leq 2.80$ at the same time. G represents a graphitization degree of the negative active material; CB represents a capacity excess ratio of the battery, which is a ratio of a capacity of the negative electrode plate to a capacity of the positive electrode plate under the same area; $V_{OI}$ represents an OI value of the negative film.

Generally, the negative electrode plate needs to undergo the following three electrochemical processes during the charging process of the battery: (1) the active ions (such as lithium ions, sodium-ions and the like) deintercalate from the positive active material and enter into the electrolyte, and then enter into the porous structure of the negative film along with the electrolyte, so that a liquid phase conduction process of the active ions in the porous structure of the negative film is completed, and the liquid phase conduction process comprises a liquid phase diffusion process and an electromigration process; (2) the active ions exchange charges with the electrons on the surface of the negative active material; (3) the active ions enter into the crystal structure of the negative active material from the surface of the negative active material through a solid phase conduction process.

The energy density of the battery is closely related to the graphitization degree of the negative active material and the designed capacity excess ratio of the battery. Generally, the higher the graphitization degree of the negative active material is, the closer the crystal structure of the negative active material to perfect layered structure of the ideal graphite is, the less the defects (such as fault, dislocation and the like) in the crystal structure of the negative active material is, the higher the capacity pergram of the negative active material is, and the less the needed amount of the negative active material to achieve the expected capacity in the design of the battery is, therfore the higher the graphitization degree of the negative active material is, the more beneficial to improve the energy density of the battery is.

The amount of sites for receiving the active ions in the negative electrode plate generally is more than the amount of sites for deintercalating the active ions in the positive electrode plate in the design of the battery so as to make the battery has good safety performance, however, the higher the capacity excess ratio of the battery is, the lower the availability of the sites for receiving the active ions in the negative electrode plate is when the battery is fully charged, therefore the energy density of the battery is decreased.

The dynamics performance of the battery is closely related to active sites in the negative film and the designed capacity excess ratio of the battery. Generally, the more the active sites in the negative film is, the faster the charge exchange speed between the active ions and the electrons on the surface of the negative active material is when the battery is charged, the better the dynamics performance of the battery is, and the larger the charging rate that the battery can bear is. The active sites in the negative film may be characterized by the OI value of the negative film represented by $V_{OI}$, generally, the smaller the OI value of the negative film is, the more the end faces capable of deintercalating and intercalating the active ions in the negative film is, and the more the active sites in the negative film is. The lower the designed capacity excess ratio of the battery is, the higher the SOC of the negative electrode plate is when the battery is fully charged, the lower the potential of the negative electrode plate is when the battery is charged under a large rate and in turn the polarization of the battery occurs, the easier the active ions are reduced and precipitated on the negative electrode plate, therefore the smaller the capacity excess ratio of the battery is, the worse the dynamics performance of the battery is, and the more unbeneficial the battery is charged under a large rate and a fast speed.

In the design of the battery in the present disclosure, when the graphitization degree of the negative active material represented by G and the capacity excess ratio of the battery represented by CB satisfy a relationship $3.9 \leq G \times 3.5 + 2.8/CB \leq 6.2$, and the OI value of the negative film represented by $V_{OI}$ and the capacity excess ratio of the battery represented by CB satisfy a relationship $1.23 \leq 0.55/V_{OI} + CB \times 1.2 \leq 2.80$, the battery may have the characteristics of high energy density, excellent dynamics performance and long cycle life at the same time while charged under a large rate and a fast speed.

When the graphitization degree of the negative active material represented by G is too large or the capacity excess ratio of the battery represented by CB is too small so as to make an upper limit value of $G \times 3.5 + 2.8/CB$ be more than 6.2, the performance of the battery cannot be greatly improved. This is because, when the graphitization degree of the negative active material represented by G is too large, the negative active material particles are prone to be flat shaped, the porous structure of the negative film is too dense, the infiltration of the electrolyte is more difficult, the liquid phase conduction resistance of the active ions inside the porous structure of the negative film is larger, the dynamics performance of the battery is worse, which is not beneficial for the battery to be charged under a fast speed; when the capacity excess ratio of the battery represented by CB is too small, the amount of the sites for receiving the active ions in the negative electrode plate is not sufficient when the battery is fully charged, the active ions are easily reduced and precipitated on the negative electrode plate, and therefore there is a higher safety hazard in the battery.

When the graphitization degree of the negative active material represented by G is too small or the capacity excess ratio of the battery represented by CB is too large so as to make a lower limit value of $G \times 3.5 + 2.8/CB$ be less than 3.9, the performance of the battery cannot be greatly improved either. This is because, when the graphitization degree of the negative active material represented by G is too small, the crystal structure of the negative active material is prone to be amorphous structured, the defects in the negative active material are more, therefore the capacity pergram of the negative active material is lower, which is not beneficial for obtaining a battery having high energy density; when the capacity excess ratio of the battery represented by CB is too large, the availability of the sites for receiving the active ions in the negative electrode plate is lower when the battery is fully charged, and the energy density of the battery is also decreased.

Preferably, the graphitization degree of the negative active material represented by G and the capacity excess ratio of the battery represented by CB satisfy a relationship $4.2 \leq G \times 3.5 + 2.8/CB \leq 6.0$.

When the OI value of the negative film represented by $V_{OI}$ is too small or the capacity excess ratio of the battery represented by CB is too large so as to make an upper limit value of $0.55/V_{OI} + CB \times 1.2$ be more than 2.80, the comprehensive performances of the battery are worse. This is because, when the OI value of the negative film represented by $V_{OI}$ is too small, the negative active materials tend to be randomly distributed, the effective end faces capable of deintercalating and intercalating the active ions in the negative electrode plate are more, however, the bonding force of the negative electrode plate is worse, exfoliation of the negative film of the negative electrode plate easily occurs, and the negative electrode plate is easily wrinkled during the cycle process so as to make the interface of the negative electrode plate worse, and therefore the battery easily dives during the cycle process; when the capacity excess ratio of the battery represented by CB is too large, the content of the negative active material is more, the negative film is thicker, the liquid phase conduction resistance of the active ions inside the porous structure of the negative film is larger, therefore it is not beneficial for the battery to be charged under a fast speed, and even the active ions are reduced and precipitated on the negative electrode plate, and the availability of the sites for receiving the active ions in the negative electrode plate is lower when the battery is fully charged, which will decrease the energy density of the battery.

When the OI value of the negative film represented by $V_{OI}$ is too large or the capacity excess ratio of the battery represented by CB is too small so as to make a lower limit value of $0.55/V_{OI} + CB \times 1.2$ be less than 1.23, the comprehensive performances of the battery are also worse. This is because, when the OI value of the negative film represented by $V_{OI}$ is too large, the negative active materials tend to be distributed parallel to the negative current collector, the effective end faces capable of deintercalating and intercalating the active ions in the negative film are less, the active sites in the negative film are less, the charge exchange speed between the active ions and the electrons on the surface of the negative active material is affected, therefore the dynamics performance of the battery is worse, which cannot meet the demands of the battery on fast charging speed; when the capacity excess ratio of the battery represented by CB is too small, the SOC of the negative electrode plate is too large when the battery is fully charged, the potential of the negative electrode plate is lower when the battery is charged under a large rate and in turn the polarization of the battery occurs, the active ions are easily reduced and precipitated on the negative electrode plate, therefore there is a higher safety hazard in the battery.

Preferably, the OI value of the negative film represented by $V_{OI}$ and the capacity excess ratio of the battery represented by CB satisfy a relationship $1.25 \leq 0.55/V_{OI} + CB \times 1.2 \leq 2.32$.

It should be noted that, a particle diameter of the negative active material represented by D50 and an OI value of a powder of the negative active material represented by $G_{OI}$ both will effect the OI value of the negative film represented by $V_{OI}$ to an extent, therefore the desired $V_{OI}$ may be obtained by changing the value of D50 and the value of $G_{OI}$; the OI value of the negative film represented by $V_{OI}$ may also be changed by using magnetic field inducing technique during the coating process of the negative slurry so as to artificially induce the arrangement of the negative active materials in the negative electrode plate; the OI value of the negative film represented by $V_{OI}$ may also be changed by adjusting the pressing density of the negative film during the cold pressing process so as to change the arrangement of the negative active materials in the negative electrode plate.

Preferably, the particle diameter of the negative active material represented by D50 is 1 µm~20 µm. More preferably, the particle diameter of the negative active material represented by D50 is 4 µm~15 µm.

Preferably, the OI value of the powder of the negative active material represented by $G_{OI}$ is 0.5~7. More preferably, the OI value of the powder of the negative active material represented by $G_{OI}$ is 2~4.5.

In the secondary battery of the present disclosure, a ratio of $G \times 3.5 + 2.8/CB$ to $0.55/V_{OI} + CB \times 1.2$ can be defined as an equilibrium constant of the battery represented by K, and when the equilibrium constant of the battery represented by K is 1.60~5.02, the comprehensive performances of the battery may be further improved.

When the value of $G \times 3.5 + 2.8/CB$ is larger or the value of $0.55/V_{OI} + CB \times 1.2$ is smaller so as to make the equilibrium constant of the battery represented by K be more than 5.02, it indicates that the charging speed of the battery is compromised in order to obtain a battery having high energy density, finally when the battery is charged under a large rate and a fast speed, there is a higher risk that the active ions are reduced and precipitated on the negative electrode plate, therefore there is a higher safety hazard in the battery, and the cycle performance of the battery cannot be ensured.

When the value of $G \times 3.5 + 2.8/CB$ is smaller or the value of $0.55/V_{OI} + CB \times 1.2$ is larger so as to make the equilibrium constant of the battery represented by K be less than 1.60, it indicates that the energy density of the battery is compromised in order to obtain a battery having fast charging speed, and users will be troubled by the shorter endurance mileage of the battery during the actual use.

Preferably, the equilibrium constant of the battery represented by K is 1.95~4.80.

In the secondary battery of the present disclosure, preferably, the graphitization degree of the negative active material represented by G is 70%~99%; more preferably, the graphitization degree of the negative active material represented by G is 75%~98%.

In the secondary battery of the present disclosure, preferably, the capacity excess ratio of the battery represented by CB is 1.01~2.2; more preferably, the capacity excess ratio of the battery represented by CB is 1.03~1.8.

In the secondary battery of the present disclosure, preferably, the OI value of the negative film represented by $V_{OI}$ is 2~100; more preferably, the OI value of the negative film represented by $V_{OI}$ is 3~40.

In the secondary battery of the present disclosure, the graphite is one or more selected from a group consisting of artificial graphite and natural graphite. The negative active material may further comprise one or more selected from a group consisting of soft carbon, hard carbon, carbon fiber, mesocarbon microbeads, silicon-based material, tin-based material and lithium titanate besides the graphite. Preferably, the silicon-based material may be elemental silicon, silicon oxide, silicon carbon composite and silicon alloy; the tin-based material may be elemental tin, tin oxide compound and tin alloy.

In the secondary battery of the present disclosure, the negative film may be provided on one of the surfaces of the negative current collector, and the negative film may also be provided on both surfaces of the negative current collector.

In the secondary battery of the present disclosure, the negative film further comprises a conductive agent and a binder, the types and the contents of the conductive agent and the binder are not specifically limited and may be selected based on actual demands.

In the secondary battery of the present disclosure, the type of the negative current collector is not specifically limited and may be selected based on actual demands, and preferably, the negative current collector is a copper foil.

In the secondary battery of the present disclosure, the graphitization degree of the negative active material may be obtained by a X-ray powder diffractometer (X'pert PRO), an interlayer space of the graphite represented by $d_{002}$ is obtained according to the general rules for X-ray diffractometric analysis JIS K 0131-1996 and the determination method of graphite lattice parameter JB/T4220-2011, and the graphitization degree of the negative active material is then obtained according to an equation $G = (0.344 - d_{002})/(0.344 - 0.3354)$.

The OI value of the negative film may be obtained by a X-ray powder diffractometer (X'pert PRO), a X-ray diffraction pattern of the negative electrode plate is obtained according to the general rules for X-ray diffractometric analysis JIS K 0131-1996 and the determination method of artificial graphite lattice parameter JB/T4220-2011, and the OI value of the negative film is obtained according to an equation $V_{OI} = C_{004}/C_{110}$, $C_{004}$ represents characteristic diffraction peak area of (004) crystal plane, $C_{110}$ represents characteristic diffraction peak area of (110) crystal plane.

The capacity excess ratio of the battery represented by CB represents a ratio of the capacity of the negative electrode plate to the capacity of the positive electrode plate under the same area. The capacity of the positive electrode plate may be obtained by a button battery assembled from the positive electrode plate and a lithium foil, and then the charging capacity of the button battery is tested by a LAND tester (CT2001A); the capacity of the negative electrode plate may be obtained by a button battery assembled from the negative electrode plate and a lithium foil, and then the charging capacity of the button battery is tested by a LAND tester (CT2001A). The capacity of the positive electrode plate and the capacity of the negative electrode plate may also be obtained according to following equations: the capacity of the negative electrode plate=the reversible capacity pergram of the negative active material×the coating weight of the negative electrode plate×the weight ratio of the negative active material; the capacity of the positive electrode plate=the reversible capacity pergram of the positive active material×the coating weight of the positive electrode plate×the weight ratio of the positive active material.

In the secondary battery of the present disclosure, the positive electrode plate comprises a positive current collector and a positive film, the positive film is provided on a surface of the positive current collector and comprises a positive active material, a conductive agent and a binder. The specific type and the specific composition of the positive electrode plate are not specifically limited and may be selected based on actual demands.

In the secondary battery of the present disclosure, it should be noted that, the secondary battery may be a lithium-ion battery or a sodium-ion battery.

Specifically, when the battery is the lithium-ion battery, the positive active material may be selected from lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate, but the present disclosure is not limited to these materials, other conventionally known materials that can be used as the positive active material of the lithium-ion battery can also be used. These positive active materials may be used alone or may be used two or more of them in combination. Preferably, the positive active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ and $LiMnPO_4$.

Specifically, when the battery is the sodium-ion battery, the positive active material may be selected from transition metal oxide $Na_xMO_2$ (M represents transition metal, preferably, M is one or more selected from a group consisting of Mn, Fe, Ni, Co, V, Cu and Cr, $0<x\leq1$), polyanion-type material (phosphate-type, fluorophosphate-type, pyrophosphate-type and sulfate-type) and prussian blue material, but the present disclosure is not limited to these materials, other conventionally known materials that can be used as the positive active material of the sodium-ion battery can also be used. These positive active materials may be used alone or may be used two or more of them in combination. Preferably, the positive active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with a general formula of $A_aM_b(PO_4)_cO_xY_{3-x}$ (A is one or more selected from a group consisting of $H^+$, $Li^+$, $Na^+$, $K^+$ and $NH_4^-$; M represents transition metal cation, preferably, M is one or more selected from a group consisting of V, Ti, Mn, Fe, Co, Ni, Cu and Zn; Y represents anion of halogen, preferably, Y is one or more selected from a group consisting of F, Cl and Br; $0<a\leq4$, $0<b\leq2$, $1\leq c\leq3$, $0\leq x\leq2$).

In the secondary battery of the present disclosure, the specific type and the specific composition of the separator and the electrolyte are not specifically limited and may be selected based on actual demands.

Hereinafter the present disclosure will be described in detail in combination with examples. It should be noted that, the examples described in the present disclosure are only used for explaining the present disclosure, and are not intended to limit the present disclosure.

Batteries of examples 1-67 and comparative examples 1-8 were all prepared in accordance with the following preparation method.

(1) Preparation of a Positive Electrode Plate

NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on aluminum foil (positive current collector), drying was then performed under room temperature and continual drying was performed in an oven, which was then followed by cold pressing and plate cutting, finally the positive electrode plate was obtained.

(2) Preparation of a Negative Electrode Plate

Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on copper foil (negative current collector), drying was then performed under room temperature and continual drying was performed in an oven, which was then followed by cold pressing and plate cutting, finally the negative electrode plate was obtained.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter test processes of the lithium-ion batteries were described.

(1) Testing of the Measured Energy Density:

At 25° C., the lithium-ion batteries prepared in the examples and the comparative examples were fully charged at a constant current of 1 C and fully discharged at a constant current of 1 C, the measured discharge capacity at this time was recorded; at 25° C., the lithium-ion batteries were weighed by a electronic balance. And the measured energy density of the lithium-ion battery was a ratio of the measured discharge capacity of the lithium-ion battery diacharged at 1 C to the weight of the lithium-ion battery. When the measured energy density was less than 80% of the targeted energy density, the measured energy density of the battery was considered to be very low; when the measured energy density was more than or equal to 80% of the targeted energy density and less than 95% of the targeted energy density, the measured energy density of the battery was considered to be lower; when the measured energy density was more than or equal to 95% of the targeted energy density and less than 105% of the targeted energy density, the measured energy density of the battery was considered to be moderate; when the measured energy density was more than or equal to 105% of the targeted energy density and less than 120% of the targeted energy density, the measured energy density of the battery was considered to be higher; when the measured energy density was more than or equal to 120% of the targeted energy density, the measured energy density of the battery was considered to be very high.

(2) Testing of the Dynamics Performance:

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(3) Testing of the Cycle Performance:

At 25° C., the lithium-ion batteries prepared in the examples and the comparative examples were charged at a constant current of 3 C and discharged at a constant current of 1 C, the fully charging/discharging cycle process was repeated until the capacity of the lithium-ion battery decayed to 80% of the initial capacity, and the cycle number of the lithium-ion battery was recorded.

TABLE 1

Parameters and test results of examples 1-67 and comparative examples 1-8

| | Negative active material | Graphitization degree (G) | CB | $V_{OI}$ | $G \times 3.5 + 2.8/CB$ | $0.55/V_{OI} + CB \times 1.2$ | Equilibrium constant of battery (K) | Measured energy density | Dynamics performance | Cycle number |
|---|---|---|---|---|---|---|---|---|---|---|
| Example 1 | graphite | 70% | 1.01 | 25 | 5.22 | 1.23 | 4.232 | moderate | Slight lithium precipitation | 2200 |
| Example 2 | graphite | 75% | 1.01 | 25 | 5.40 | 1.23 | 4.374 | moderate | slight lithium precipitation | 2440 |
| Example 3 | graphite | 80% | 1.01 | 25 | 5.57 | 1.23 | 4.516 | moderate | slight lithium recipitation | 2340 |
| Example 4 | graphite | 85% | 1.01 | 25 | 5.75 | 1.23 | 4.657 | moderate | slight lithium precipitation | 2180 |
| Example 5 | graphite | 92% | 1.01 | 25 | 5.99 | 1.23 | 4.856 | higher | slight lithium precipitation | 2570 |
| Example 6 | graphite | 93% | 1.01 | 25 | 6.03 | 1.23 | 4.884 | higher | slight lithium precipitation | 2720 |
| Example 7 | graphite | 96% | 1.01 | 25 | 6.13 | 1.23 | 4.969 | higher | slight lithium precipitation | 2560 |
| Example 8 | graphite | 70% | 1.4 | 25 | 4.45 | 1.70 | 2.615 | moderate | no lithium precipitation | 4100 |
| Example 9 | graphite | 75% | 1.4 | 25 | 4.63 | 1.70 | 2.717 | moderate | no lithium precipitation | 4150 |
| Example 10 | graphite | 80% | 1.4 | 25 | 4.80 | 1.70 | 2.820 | moderate | no lithium precipitation | 4120 |
| Example 11 | graphite | 85% | 1.4 | 25 | 4.98 | 1.70 | 2.923 | moderate | no lithium precipitation | 4380 |
| Example 12 | graphite | 92% | 1.4 | 25 | 5.22 | 1.70 | 3.067 | moderate | no lithium precipitation | 4380 |
| Example 13 | graphite | 93% | 1.4 | 25 | 5.26 | 1.70 | 3.088 | moderate | no lithium precipitation | 4420 |
| Example 14 | graphite | 96% | 1.4 | 25 | 5.36 | 1.70 | 3.149 | moderate | no lithium precipitation | 4300 |
| Example 15 | graphite | 98% | 1.4 | 25 | 5.43 | 1.70 | 3.190 | moderate | no lithium precipitation | 4280 |
| Example 16 | graphite | 99% | 1.4 | 25 | 5.47 | 1.70 | 3.211 | moderate | no lithium precipitation | 4200 |
| Example 17 | graphite | 70% | 1.8 | 25 | 4.01 | 2.18 | 1.836 | lower | no lithium precipitation | 4800 |
| Example 18 | graphite | 75% | 1.8 | 25 | 4.18 | 2.18 | 1.916 | lower | no lithium precipitation | 4600 |
| Example 19 | graphite | 80% | 1.8 | 25 | 4.36 | 2.18 | 1.996 | moderate | no lithium precipitation | 4670 |
| Example 20 | graphite | 86% | 1.8 | 25 | 4.57 | 2.18 | 2.092 | moderate | no lithium precipitation | 4300 |
| Example 21 | graphite | 88% | 1.8 | 25 | 4.64 | 2.18 | 2.124 | moderate | no lithium precipitation | 4600 |
| Example 22 | graphite | 93% | 1.8 | 25 | 4.81 | 2.18 | 2.205 | moderate | no lithium precipitation | 4700 |
| Example 23 | graphite | 96% | 1.8 | 25 | 4.92 | 2.18 | 2.253 | moderate | no lithium precipitation | 4580 |
| Example 24 | graphite | 98% | 1.8 | 25 | 4.99 | 2.18 | 2.285 | moderate | no lithium precipitation | 4280 |
| Example 25 | graphite | 99% | 1.8 | 25 | 5.02 | 2.18 | 2.301 | moderate | no lithium precipitation | 4100 |
| Example 26 | graphite | 85% | 2.0 | 25 | 4.38 | 2.42 | 1.806 | moderate | slight lithium precipitation | 2760 |
| Example 27 | graphite | 90% | 2.0 | 25 | 4.55 | 2.42 | 1.879 | moderate | slight lithium precipitation | 2360 |
| Example 28 | graphite | 98% | 2.0 | 25 | 4.83 | 2.42 | 1.994 | moderate | slight lithium precipitation | 2400 |
| Example 29 | graphite | 99% | 2.0 | 25 | 4.87 | 2.42 | 2.009 | moderate | slight lithium precipitation | 2500 |

TABLE 1-continued

Parameters and test results of examples 1-67 and comparative examples 1-8

| | Negative active material | Graphitization degree (G) | CB | $V_{OI}$ | $G \times 3.5 + 2.8/CB$ | $0.55/V_{OI} + CB \times 1.2$ | Equilibrium constant of battery (K) | Measured energy density | Dynamics performance | Cycle number |
|---|---|---|---|---|---|---|---|---|---|---|
| Example 30 | graphite | 90% | 1.01 | 20 | 5.92 | 1.24 | 4.778 | moderate | slight lithium precipitation | 2700 |
| Example 31 | graphite | 90% | 1.01 | 15 | 5.92 | 1.25 | 4.743 | moderate | no lithium precipitation | 4390 |
| Example 32 | graphite | 90% | 1.01 | 8 | 5.92 | 1.28 | 4.624 | moderate | no lithium precipitation | 4500 |
| Example 33 | graphite | 90% | 1.01 | 6 | 5.92 | 1.30 | 4.543 | moderate | no lithium precipitation | 4460 |
| Example 34 | graphite | 90% | 1.01 | 3 | 5.92 | 1.40 | 4.244 | moderate | no lithium precipitation | 4680 |
| Example 35 | graphite | 90% | 1.01 | 2 | 5.92 | 1.49 | 3.983 | moderate | no lithium precipitation | 4200 |
| Example 36 | graphite | 90% | 1.4 | 120 | 5.15 | 1.68 | 3.057 | moderate | slight lithium precipitation | 2600 |
| Example 37 | graphite | 90% | 1.4 | 100 | 5.15 | 1.69 | 3.055 | moderate | no lithium precipitation | 3800 |
| Example 38 | graphite | 90% | 1.4 | 80 | 5.15 | 1.69 | 3.053 | moderate | no lithium precipitation | 4000 |
| Example 39 | graphite | 90% | 1.4 | 40 | 5.15 | 1.69 | 3.041 | moderate | no lithium precipitation | 4070 |
| Example 40 | graphite | 90% | 1.4 | 20 | 5.15 | 1.71 | 3.016 | moderate | no lithium precipitation | 4090 |
| Example 41 | graphite | 90% | 1.4 | 15 | 5.15 | 1.72 | 3.000 | moderate | no lithium precipitation | 4300 |
| Example 42 | graphite | 90% | 1.4 | 8 | 5.15 | 1.75 | 2.945 | moderate | no lithium precipitation | 4570 |
| Example 43 | graphite | 90% | 1.4 | 6 | 5.15 | 1.77 | 2.907 | moderate | no lithium precipitation | 4100 |
| Example 44 | graphite | 90% | 1.4 | 3 | 5.15 | 1.86 | 2.764 | moderate | no lithium precipitation | 4360 |
| Example 45 | graphite | 90% | 1.4 | 2 | 5.15 | 1.96 | 2.634 | moderate | no lithium precipitation | 4470 |
| Example 46 | graphite | 90% | 1.8 | 120 | 4.71 | 2.16 | 2.174 | moderate | slight lithium precipitation | 2400 |
| Example 47 | graphite | 90% | 1.8 | 100 | 4.71 | 2.17 | 2.173 | moderate | no lithium precipitation | 3700 |
| Example 48 | graphite | 90% | 1.8 | 80 | 4.71 | 2.17 | 2.172 | moderate | no lithium precipitation | 3900 |
| Example 49 | graphite | 90% | 1.8 | 40 | 4.71 | 2.17 | 2.165 | moderate | no lithium precipitation | 4200 |
| Example 50 | graphite | 90% | 1.8 | 20 | 4.71 | 2.19 | 2.151 | moderate | no lithium precipitation | 4100 |
| Example 51 | graphite | 90% | 1.8 | 15 | 4.71 | 2.20 | 2.142 | moderate | no lithium precipitation | 4380 |
| Example 52 | graphite | 90% | 1.8 | 8 | 4.71 | 2.23 | 2.111 | moderate | no lithium precipitation | 4210 |
| Example 53 | graphite | 90% | 1.8 | 4 | 4.71 | 2.30 | 2.048 | moderate | no lithium precipitation | 4440 |
| Example 54 | graphite | 90% | 1.8 | 3 | 4.71 | 2.34 | 2.008 | moderate | Slight lithium precipitation | 2560 |
| Example 55 | graphite | 90% | 1.8 | 2 | 4.71 | 2.44 | 1.932 | moderate | slight lithium precipitation | 2100 |
| Example 56 | graphite | 90% | 2 | 120 | 4.55 | 2.40 | 1.892 | moderate | moderate lithium precipitation | 1600 |
| Example 57 | graphite | 90% | 2.0 | 100 | 4.55 | 2.41 | 1.891 | moderate | moderate lithium precipitation | 1900 |
| Example 58 | graphite | 90% | 2.0 | 80 | 4.55 | 2.41 | 1.890 | moderate | slight lithium precipitation | 2000 |
| Example 59 | graphite | 90% | 2.0 | 40 | 4.55 | 2.41 | 1.885 | moderate | slight lithium precipitation | 2170 |
| Example 60 | graphite | 90% | 2.0 | 20 | 4.55 | 2.43 | 1.874 | moderate | slight lithium precipitation | 2180 |
| Example 61 | graphite | 90% | 2.0 | 15 | 4.55 | 2.44 | 1.867 | moderate | slight lithium precipitation | 2300 |
| Example 62 | graphite | 90% | 2.0 | 8 | 4.55 | 2.47 | 1.843 | moderate | slight lithium precipitation | 2370 |
| Example 63 | graphite + soft carbon (7:3) | 90% | 1.2 | 20 | 5.48 | 1.47 | 3.737 | moderate | no lithium precipitation | 5500 |
| Example 64 | graphite + hard carbon (7:3) | 88% | 1.2 | 9.5 | 5.41 | 1.50 | 3.614 | moderate | no lithium precipitation | 5100 |

TABLE 1-continued

Parameters and test results of examples 1-67 and comparative examples 1-8

| | Negative active material | Graphitization degree (G) | CB | $V_{OI}$ | G × 3.5 + 2.8/CB | 0.55/$V_{OI}$ + CB × 1.2 | Equilibrium constant of battery (K) | Measured energy density | Dynamics performance | Cycle number |
|---|---|---|---|---|---|---|---|---|---|---|
| Example 65 | graphite + lithium titanate (7:3) | 91% | 1.1 | 15 | 5.73 | 1.36 | 4.224 | moderate | no lithium precipitation | 6300 |
| Example 66 | graphite | 97% | 1.01 | 40 | 6.17 | 1.23 | 5.031 | higher | slight lithium precipitation | 2140 |
| Example 67 | graphite | 83% | 2.2 | 25 | 4.18 | 2.66 | 1.569 | lower | slight lithium precipitation | 2100 |
| Comparative example 1 | graphite | 60% | 1.8 | 10 | 3.66 | 2.22 | 1.650 | very low | moderate lithium precipitation | 1300 |
| Comparative example 2 | graphite | 99% | 1.0 | 10 | 6.27 | 1.26 | 4.992 | very high | serious lithium precipitation | 410 |
| Comparative example 3 | graphite | 99% | 1.01 | 25 | 6.24 | 1.23 | 5.055 | very high | serious lithium precipitation | 620 |
| Comparative example 4 | graphite | 70% | 2.2 | 25 | 3.72 | 2.66 | 1.398 | very low | slight lithium precipitation | 2200 |
| Comparative example 5 | graphite | 99% | 2.0 | 1.0 | 4.87 | 2.95 | 1.649 | moderate | serious lithium precipitation | 780 |
| Comparative example 6 | graphite | 90% | 1.01 | 120 | 5.92 | 1.22 | 4.868 | moderate | serious lithium precipitation | 670 |
| Comparative example 7 | graphite | 90% | 2.2 | 3 | 4.42 | 2.82 | 1.566 | moderate | serious lithium precipitation | 670 |
| Comparative example 8 | graphite | 90% | 2.2 | 2 | 4.42 | 2.92 | 1.517 | moderate | serious lithium precipitation | 720 |

In the examples of the present disclosure, when the graphitization degree of the negative active material represented by G and the capacity excess ratio of the battery represented by CB satisfied a relationship 3.9≤G×3.5+2.8/CB≤6.2 and the OI value of the negative film represented by $V_{OI}$ and the capacity excess ratio of the battery represented by CB satisfied a relationship 1.23≤0.55/$V_{OI}$+CB×1.2≤2.80, the battery having the characteristics of high energy density, long cycle life and excellent dynamics performance at the same time could be obtained.

When the graphitization degree of the negative active material represented by G was too small or the capacity excess ratio of the battery represented by CB was too large so as to make the lower limit value of G×3.5+2.8/CB be less than 3.9, the crystal structure of the graphite was prone to be amorphous structured, the defects in the graphite were more, the capacity pergram of the graphite was lower, the measured energy density of the battery was very low; and the availability of the sites for receiving the lithium ions in the negative electrode plate was also lower when the battery was fully charged, therefore the measured energy density of the battery was further decreased.

When the graphitization degree of the negative active material represented by G was too large or the capacity excess ratio of the battery represented by CB was too small so as to make the upper limit value of G×3.5+2.8/CB be more than 6.2, although the measured energy density of the battery was very high, the graphite particles were prone to be flat shaped, the porous structure of the negative film was too dense, the infiltration of the electrolyte was difficult, the liquid phase conduction resistance of the lithium ions inside the porous structure of the negative film was larger, the dynamics performance of the battery was worse; and moreover, the amount of sites in the negative electrode plate for receiving the lithium ions was not sufficient when the battery was fully charged, serious lithium precipitation occurred on the negative electrode plate when the battery was charged under a large rate and a fast speed, therefore the battery had a higher safety hazard and easily dived during the cycle process. The capacity of comparative example 2 dived after 410 cycles.

The specific range of the graphitization degree of the negative active material represented by G and the specific range of the capacity excess ratio of the battery represented by CB were not limited, so long as the value of G×3.5+2.8/CB was between 3.9 and 6.2. The preferred range of the graphitization degree of the negative active material represented by G was 70%~99%, and the preferred range of the capacity excess ratio of the battery represented by CB was 1.01~2.2. Even though the graphitization degree of the negative active material represented by G and the capacity excess ratio of the battery represented by CB both fell within the above preferred ranges, but could not make the value of G×3.5+2.8/CB be between 3.9 and 6.2, the battery having the characteristics of high energy density, long cycle life and excellent dynamics performance at the same time could not be obtained. The capacity of comparative example 3 dived after 620 cycles; the measured energy density of comparative example 4 was very low due to the unreasonable parameters.

Whe the OI value of the negative film represented by $V_{OI}$ was too small or the capacity excess ratio of the battery represented by CB was too large so as to make the upper limit value of 0.55/$V_{OI}$+CB×1.2 be more than 2.80, the bonding force of the negative electrode plate was worse, exfoliation of the negative film of the negative electrode plate easily occurred, the negative electrode plate was easily wrinkled during the cycle process so as to make the interface of the negative electrode plate worse, and therefore the battery easilydived during the cycle process; and moreover, the too thick negative film made the liquid phase conduction resistance of the lithium ions inside the porous structure of the negative film larger, the dynamics performance of the battery was worse, and the lithium ions were easily precipitated on the negative electrode plate when the battery was charged under a large rate and a fast speed, therefore the battery had a higher safety hazard and easily dived during the cycle process. The capacity of comparative example 5 dived after 780 cycles.

When the OI value of the negative film represented by $V_{OI}$ was too large or the capacity excess ratio of the battery represented by CB was too small so as to make the lower limit value of $0.55/V_{OI}+CB\times1.2$ be less than 1.23, the graphite particles tended to be distributed parallel to the negative current collector, the active sites on the surface of the graphite were less, the charge exchange speed between the lithium ions and the electrons was affected; and moreover, the too small CB made the SOC of the negative electrode plate too high when the battery was fully charged, the potential of the negative electrode plate was lower when the battery was charged under a large rate and in turn the polarization of the battery occurred, the lithium ions were easily precipitated on the negative electrode plate, therefore the battery had a higher safety hazard and easily dived during the cycle process. The capacity of comparative example 6 dived after 670 cycles.

The specific range of the OI value of the negative film represented by $V_{OI}$ was not limited either, so long as the value of $0.55/V_{OI}+CB\times1.2$ was between 1.23 and 2.80, for example, in example 36, example 46 and example 56, although the OI value of the negative film represented by $V_{OI}$ was larger, the value of $0.55/V_{OI}+CB\times1.2$ was between 1.23 and 2.80 by using an appropriate capacity excess ratio of the battery represented by CB, and the battery could still have the characteristics of high energy density, long cycle life and excellent dynamics performance at the same time. The preferred range the OI value of the negative film represented by $V_{OI}$ was 2~100. Even though the OI value of the negative film represented by $V_{OI}$ fell within the above preferred range, the OI value of the negative film represented by $V_{OI}$ and the capacity excess ratio of the battery represented by CB were unreasonably designed and could not make the value of $0.55/V_{OI}+CB\times1.2$ be between 1.23 and 2.80, the battery having the characteristics of high energy density, long cycle life and excellent dynamics performance at the same time could not be obtained. The capacity of comparative example 7 dived after 670 cycles, and the capacity of comparative example 8 dived after 720 cycles.

Moreover, when the equilibrium constant of the battery represented by K ($K=(G\times3.5+2.8/CB)/(0.55/V_{OI}+CB\times1.2)$) further fell within the range of 1.60~5.02, the comprehensive performances of the battery were better. When the equilibrium constant of the battery represented by K was more than 5.02, it indicated that the charging speed of the battery was compromised in order to obtain a battery having high energy density, the lithium ions were easily precipitated on the negative electrode plate when battery was charged under a large rate and a fast speed, and the cycle life of the battery was also affected. When the equilibrium constant of the battery represented by K was less than 1.60, it indicated that the energy density of the battery was compromised in order to obtain a battery having fast charging speed, and the users would be troubled by the shorter endurance mileage of the battery. However, it could still meet certain demands in some relatively low-demand environments. For example, the battery of example 66 had higher energy density, although slight lithium precipitation occurred on the negative electrode plate, the cycle number of the battery could still reach 2140; although the measured energy density of the battery of example 67 was lower, the cycle number of the battery could still reach 2100.

What is claimed:

1. A secondary battery comprising a positive electrode plate, a negative electrode plate, a separator and an electrolyte, the negative electrode plate comprising a negative current collector and a negative film, the negative film being provided on at least one surface of the negative current collector and comprising a negative active material;
   wherein
   the negative active material comprises graphite, and the secondary battery satisfies relationships $3.9\leq G\times3.5+2.8/CB\leq5.47$ and $1.69\leq0.55/V_{OI}+CB\times1.2\leq2.32$ at the same time;
   G represents a graphitization degree of the negative active material, CB represents a capacity excess ratio of the battery, and $V_{OI}$ represents an OI value of the negative film,
   the capacity excess ratio of the battery represented by CB represents a ratio of a capacity of the negative electrode plate to a capacity of the positive electrode plate under the same area;
   $V_{OI}=C_{004}/C_{110}$, $C_{004}$ represents a characteristic diffraction peak area of (004) crystal plane of the negative film, $C_{110}$ represents a characteristic diffraction peak area of (110) crystal plane of the negative film; and
   the OI value of the negative film represented by $V_{OI}$ is from 3 to 40.

2. The secondary battery according to claim 1, wherein the graphitization degree of the negative active material represented by G is 70%~99%.

3. The secondary battery according to claim 2, wherein the graphitization degree of the negative active material represented by G is 75%~98%.

4. The secondary battery according to claim 1, wherein the capacity excess ratio of the battery represented by CB is 1.01~2.2.

5. The secondary battery according to claim 4, wherein the capacity excess ratio of the battery represented by CB is 1.03~1.8.

6. The secondary battery according to claim 1, wherein the secondary battery further satisfies a relationship:
   $1.95\leq(G\times3.5+2.8/CB)/(0.55/V_{OI}+CB\times1.2)\leq4.80$.

7. The secondary battery according to claim 1, wherein the negative active material further comprises one or more selected from a group consisting of soft carbon, hard carbon, carbon fiber, mesocarbon microbeads, silicon-based material, tin-based material and lithium titanate.

8. The secondary battery according to claim 1, wherein a particle diameter of the negative active material represented by D50 is 1 μm~20 μm.

9. The secondary battery according to claim 8, wherein the particle diameter of the negative active material represented by D50 is 4 μm~15 μm.

10. The secondary battery according to claim 1, wherein an OI value of a powder of the negative active material represented by $G_{OI}$ is 0.5~7,
    $G_{OI}=C'_{004}/C'_{110}$, $C'_{004}$ represents a characteristic diffraction peak area of (004) crystal plane of the powder of the negative active material, and $C'_{110}$ represents a characteristic diffraction peak area of (110) crystal plane of the powder of the negative active material.

11. The secondary battery according to claim 10, wherein the OI value of the powder of the negative active material represented by $G_{OI}$ is 2~4.5.

12. The secondary battery according to claim 1, wherein the graphite is one or more selected from a group consisting of artificial graphite and natural graphite.

* * * * *